United States Patent
Reichmann et al.

(10) Patent No.: US 8,817,398 B2
(45) Date of Patent: Aug. 26, 2014

(54) MOUNT ASSEMBLY, WHICH IS ADJUSTABLE IN A PLURALITY OF STEPS, FOR TWO OPTICAL COMPONENTS

(75) Inventors: Lutz Reichmann, Jena (DE); Matthias Bening, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 13/817,633

(22) PCT Filed: Aug. 4, 2011

(86) PCT No.: PCT/DE2011/075188
§ 371 (c)(1),
(2), (4) Date: Mar. 21, 2013

(87) PCT Pub. No.: WO2012/037933
PCT Pub. Date: Mar. 29, 2012

(65) Prior Publication Data
US 2013/0182341 A1      Jul. 18, 2013

(30) Foreign Application Priority Data
Aug. 19, 2010   (DE) .......................... 10 2010 035 223

(51) Int. Cl.
*G02B 7/02* (2006.01)

(52) U.S. Cl.
USPC .......................................... 359/822; 359/811

(58) Field of Classification Search
USPC .................................. 359/694–704, 811–830
See application file for complete search history.

(56) References Cited

U.S. PATENT DOCUMENTS

| | | | | |
|---|---|---|---|---|
| 5,194,993 A * | 3/1993 | Bedzyk | .......................... | 359/813 |
| 5,220,460 A * | 6/1993 | Bedzyk | .......................... | 359/813 |
| 6,754,013 B2 * | 6/2004 | Willis | .......................... | 359/819 |
| 6,876,494 B2 | 4/2005 | Ishikawa et al. | | |
| 2004/0145821 A1 | 7/2004 | Hergenhan | | |
| 2010/0073786 A1 * | 3/2010 | Bornschein et al. | .......... | 359/824 |

FOREIGN PATENT DOCUMENTS

| | | |
|---|---|---|
| DE | 44 00 869 C1 | 3/1995 |
| DE | 10 2007 030 579 A1 | 1/2008 |
| DE | 10 2008 029 161 B3 | 10/2009 |
| EP | 1 577 693 A2 | 9/2005 |
| GB | 2318191 A | 4/1998 |
| JP | 2001-21830 A | 1/2001 |

\* cited by examiner

*Primary Examiner* — Mohammed Hasan
(74) *Attorney, Agent, or Firm* — Duane Morris LLP

(57) ABSTRACT

Adjustable mount assembly having two mount parts which are adjustable relative to one another and which themselves form adjustable mounts respectively comprising an outer mount frame and an inner mount frame. The mount assembly permits a highly precise adjustment of two optical components relative to one another in a plane perpendicular to an axis and an adjustment of the two mutually adjusted optical components relative to a reference base.

4 Claims, 4 Drawing Sheets

MOUNT ASSEMBLY, WHICH IS ADJUSTABLE IN A PLURALITY OF STEPS, FOR TWO OPTICAL COMPONENTS

RELATED APPLICATIONS

The present application is a U.S. National Stage application of International PCT Application No. PCT/DE2011/075188 filed on Aug. 4, 2011 which claims priority benefit of German Application No. DE 10 2010 035 223.3 filed on Aug. 19, 2010, the contents of each are incorporated by reference in their entirety.

BACKGROUND OF THE INVENTION

The invention is directed to an adjustable mount of the type shown in DE 44 00 869 C1 for optical components.

An apparatus is known from U.S. Pat. No. 6,876,494 B2 by which light is projected in a predetermined pattern onto a wafer in that the light is spatially modulated via microoptical elements. It is important for the quality of the modulation that, inter alia, a microlens array associated with the apparatus be aligned in a highly accurate manner with a complementary pinhole array which is arranged behind the microlens array in direction of the optical axis.

The apparatus disclosed in U.S. Pat. No. 6,876,494 B2 is based on a prior art which is described in JP 2001-21830 according to which a pinhole array is positioned relative to a microlens array in an apparatus of the type mentioned above. It is stated that the microlens array used in JP 2001-21830 comprises microlenses with a low numerical aperture and a focal length of 5 mm, which explains why an exact positioning in direction of the optical axis is not a consideration.

However, if a microlens array with microlenses of a high numerical aperture and a focal length of approximately 250-300 μm is used, it is necessary to position the pinhole array relative to the microlens array in direction of the optical axis in a highly accurate manner so that the individual light components bundled through the microlenses are focused into the pinholes.

In order to position the microlens array and the pinhole array at an exactly predetermined distance relative to one another, it is suggested in U.S. Pat. No. 6,876,494 B2 to form on the microlens array or on the pinhole array at least one protrusion toward the other array, which protrusion has a predetermined height in direction of the optical axis and determines the spacing of the arrays. In this way the position of the arrays can be exactly adjusted relative to one another in direction of the optical axis.

Instead of the at least one protrusion, a spacer having a predetermined thickness could also be inserted between the microlens array and the pinhole array. No information can be gathered from U.S. Pat. No. 6,876,494 B2 with regard to the need for accurate positioning also perpendicular to the optical axis (lateral positioning). However, it is clear that a lateral adjustment of the two arrays with indirect contact via protrusions or a spacer is subject to friction. A sensitive, deterministic adjustment on the order of 0.05 μm such as is aimed for by the present applicant is made more difficult by the stick-slip effect.

Adjustable mounts for optical components allowing a lateral adjustment, i.e., an adjustment in a plane perpendicular to the optical axis of an optical system, generally have an outer mount part which is fixedly connected to the housing of the optical system, or is a component part of the housing, and an inner mount part which carries the optical element and can be displaced and rotated relative to the outer mount part in the plane by means of adjusting elements.

In some known adjustable mounts, the mount parts are individual parts that must be fixed relative to one another after the adjustment; in other known adjustable mounts the mount is produced monolithically and the mount parts remain in the adjusted position in a self-locking manner without needing to be fixed. Generally, the first type of mount is used for larger adjustment paths with less sensitivity and the second type of mount is used for small, highly sensitive adjustment paths.

An adjustable mount (in this case, an arrangement for lateral adjustment of lenses within a high-performance objective) in which the mount parts are individual parts is known from DE 44 00 869. The mount comprises an inner mount part (lens mount) and an outer mount part (first mount) which are connected to one another by a releasable, frictionally engaging, axially acting clamping device.

The inner mount part in which the lens is supported is held in the outer mount part, which is fitted into an objective housing, by pressing forces which act exclusively parallel to the optical axis of the objective and which are partially compensated perpendicular to the optical axis during a lateral adjustment by counterforces which are generated by piezoelectric translators arranged in the inner mount part, so as to make possible a lateral displacement of the inner mount part within the outer mount part with a small radial force.

The outer mount part has an inner plane face against which the inner mount part is pressed by pressing means. A pressing ring which is fixedly connected to the outer mount part, a spring ring and an adapting ring contacting the inner mount are advantageously used as pressing means. The pressing force of the pressing means determined by the dimensioning of the adapting ring and the springing force of the spring ring is so dimensioned that the inner mount part is reliably held in position even when mechanically loaded, e.g., when transported. The forces which act exclusively in axial direction when fixing the inner mount ring prevent the possibility of improper alignment when fixing.

The counterforce which is applied during adjustment and is generated by the piezoelectric translators is smaller than the pressing force so that the inner mount part is always pressed against the inner plane face by axial forces and cannot slip in the outer mount part in an undefined manner. A displacement first comes about under radially acting forces by means of radially acting adjusting elements.

The choice of adjusting elements to be used has a considerable influence on the reproducibility of the adjustment, on the sensitivity of the adjustment and on the possible adjustment path and ease of use. Four adjusting elements are advantageously arranged so as to be offset relative to one another by 90°. Since the adjusting elements are not intended to perform a holding function in the apparatus according to DE 44 00 869 and the axial pressing force to be overcome during the adjustment is small, the use of piezoelectric translators as adjusting elements proves particularly advantageous.

An apparatus according to DE 44 00 869 is not suitable for the relative adjustment of two optical components forming an assembly or for adjusting the assembly relative to a reference base. e.g., the optical axis of a high-performance objective.

A monolithic mount for a lens is known from DE 10 2008 029 161 B3. It comprises an annular disk which is divided by means of slits into an inner mount part and an outer mount part which preferably remain connected to one another at three locations. The persisting connections, whose geometric shape and size can be configured in different ways in principle by the position and shape of the slits, determines the possible adjustment path and the sensitivity of the adjustment. According to DE 10 2008 029 161 B3, the connections are formed by bent levers comprising two members which are connected to one another at one end by a flexure bearing and together form an angle greater than 90° and less than 180°, the other ends thereof being connected to the outer and inner mount part, respectively, by flexure bearings. The flexure bearings are portions of narrowed diameter formed by the shape and arrangement of the slits. By applying force to the connections (or manipulator units) the inner mount part can be displaced and rotated relative to the outer mount part within a plane. Monolithic mounts having manipulator units constructed in different ways are known, e.g., from EP 1 577 693 A2 and DE 10 2007 030 579 A1. The geometry of the manipulator units (shape and dimensioning) determines the possible adjustment path and sensitivity of the adjustment.

A device according to DE 10 2008 029 161 B3 is also unsuitable for the relative adjustment of two optical components forming an assembly or for adjusting the assembly relative to a reference base. e.g., the optical axis of an optical system.

SUMMARY OF THE INVENTION

An object of the invention is to provide an adjustable mount in which two optical components which form an optical assembly can be adjusted relative to one another in a highly sensitive manner over a large adjustment range and the assembly can be adjusted relative to a reference base.

In an adjustable mount assembly having a first adjustable mount comprising an outer mount part and an inner mount part which is arranged so as to be displaceable and fixable in the outer mount part in a plane perpendicular to an axis by means of adjusting screws and comprising a releasable clamping device which acts axially in a frictionally engaging manner, the object of the invention is met in that the outer mount part embodies a second adjustable mount and the inner mount part embodies a third adjustable mount which are constructed according to the invention and which communicate with one another. The outer mount part and the inner mount part are each monolithic, i.e., produced from one piece, with the exception of the manipulators. Each is formed of an outer mount frame and an inner mount frame which are connected to one another monolithically in each instance by at least three manipulator units. An optical component is fixed in the inner mount frame in each instance. A manipulator is provided for each manipulator unit for purposes of manipulating the mount parts by actuating the manipulator units.

The inner mount frame of the outer mount part communicates with the outer mount frame of the inner mount part by means of the clamping device.

Accordingly, when the clamping device is released and the adjusting screws are fixed, i.e., tightened, the two optical components can be adjusted relative to one another by manipulating the outer mount part and inner mount part or also by manipulating only one of the two mount parts.

When the clamping device is fixed, i.e., acts axially in a frictionally engaging manner so as to clamp the inner mount part to the outer mount part, and the adjusting screws are loosened, a further sensitive adjustment of the two optical components relative to one another is possible by manipulating the inner mount part, and an adjustment of the two optical components relative to a reference base is possible by manipulating the outer mount part.

The outer mount part advantageously has a plurality of threaded bore holes which extend perpendicular to the axis and into which the adjusting screws can be inserted. Accordingly, the two mount parts can be adjusted relative to one another by means of the adjusting screws without the mount being inserted into a housing beforehand. Instead of this, the adjusting screws could also be provided in a housing into which the mount is inserted and in which the outer mount is fixed by its outer mount frame.

In an advantageous manner, optical components which are microoptical components are adjusted relative to one another by the adjustable mount assembly.

For example, the optical component mounted in the inner mount part can be a microlens array, and the optical component mounted in the outer mount part can be a spatial filter array.

BRIEF DESCRIPTION OF THE DRAWINGS

The invention will be described more fully in the following with reference to embodiment examples and drawings. The drawings show.

DESCRIPTION OF THE EMBODIMENTS

Figure 1:
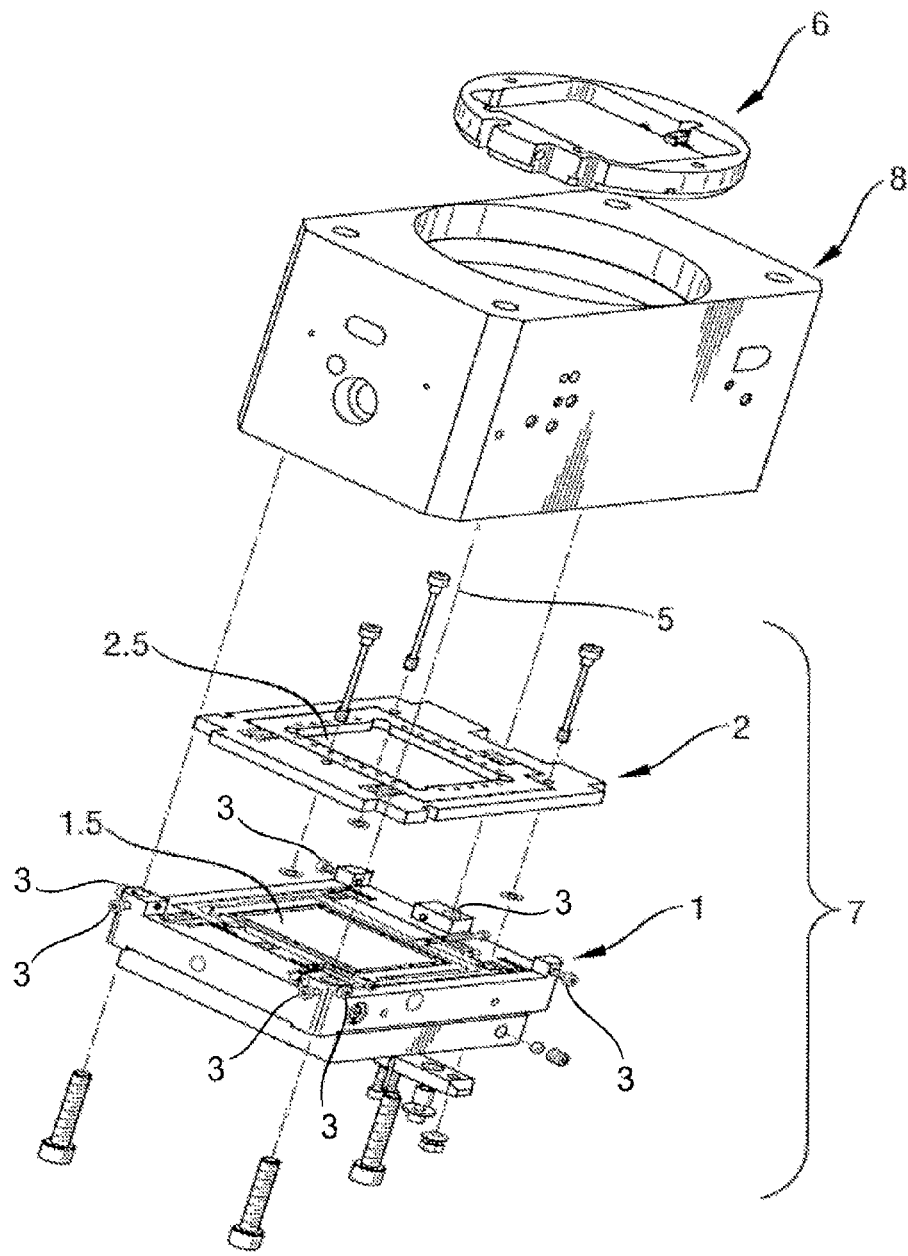
FIG. 1 an exploded view of a mount assembly according to the invention which is mounted at a housing in which a third optical component is fixed.

For purposes of a full description of the functioning of a mount assembly according to the invention, a housing 8 and an additional; mounted third optical component 6 are shown along an axis 5 in FIG. 1 in addition to the mount assembly 7. The additional; mounted third optical component 6 can be the reference base in relation to which the optical components 1.5, 2.5 which are adjusted relative to one another by means associated with the mount assembly 7 can be adjusted, likewise by means associated with the mount assembly 7.

For the sake of simplicity, reference is made in the following to only one axis 5, in relation to which displacements and rotations are enabled in planes arranged perpendicular to this axis 5 for purposes of adjustment. The axis 5 can be the optical axis of one of the optical components 1.5, 2.5 or 6 or a common optical axis on which ultimately the optical axes of the components 1.5, 2.5, 6 are disposed.

The mount assembly 7 substantially comprises an outer mount part 1 and an inner mount part 2, a clamping device 4 and a plurality of adjusting screws 3.

The outer mount part 1 and the inner mount part 2 are each monolithic component parts which are divided by means of slits into an outer mount frame 1.1, 2.1 and an inner mount frame 1.2, 2.2; material connections configured as manipulator units 1.3, 2.3 are disposed, respectively, between the outer mount frame 1.1, 2.1 and the inner mount frame 1.1, 2.2 of the two mount parts 1, 2.

Manipulators 1.4, 2.4 acting respectively on the individual manipulator units 1.3, 2.3 in a plane perpendicular to axis 5 are provided in the outer mount frame 1.1, 2.1. By selectively manipulating the manipulators 1.4, 2.4, which can be piezoelectric adjusting elements or adjusting screws, an adjustment path is introduced into the manipulator units 1.3, 2.3 which leads to a change in position of the respective inner mount frame 1.2, 2.2 through displacement and rotation with a transmission ratio determined by the shape and dimensioning of the manipulator units 1.3, 2.3. An optical component 1.5 is fixed in each of the inner mount frames 1.2, 2.2.

Monolithic mounts, as embodied by the inner mount part 2 and outer mount part 1, are known from the art.

The choice of shape and dimensioning of the manipulator units 1.3, 2.3 and of the manipulators 1.4, 2.4 will be made by the person skilled in the art on the basis of the desired adjustment range, the desired sensitivity and the limitations respecting space and access imposed by the design.

Therefore, the subject matter of the invention is not directed to the specific construction of the manipulator units 1.3, 2.3. The skilled person will derive a variety of suggestions for this purpose from the prior art.

However, the specific arrangement and connection, according to the invention, of two monolithic mounts to form a mount assembly 7 is essential to the invention.

Figure 3:
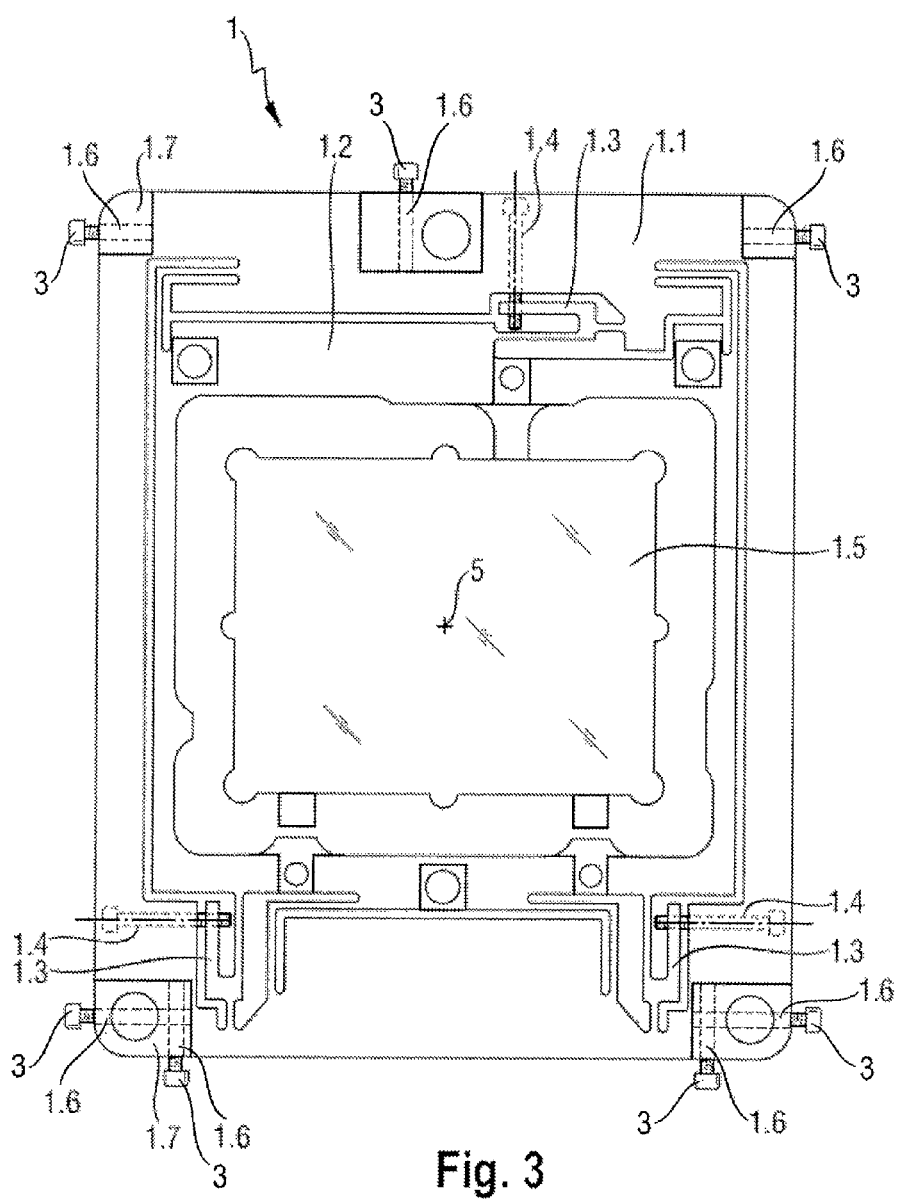
FIG. 3 a top view of the outer mount part.

FIG. 3 shows a top view of the outer mount part 1. It is clearly shown that the outer mount part 1 is divided into outer mount frame 1.1, inner mount frame 1.2 and manipulator units 1.3 by slits introduced through electric discharge machining. Opposing the above-mentioned operating parts which lie in a plane with respect to which the axis 5 extends perpendicularly, protrusions 1.7 are formed in the edge region of the outer mount part 1 at the outer mount frame 1.1 thereof. Threaded bore holes 1.6 are provided in these protrusions 1.7 in a plane perpendicular to axis 5.

Figure 2:
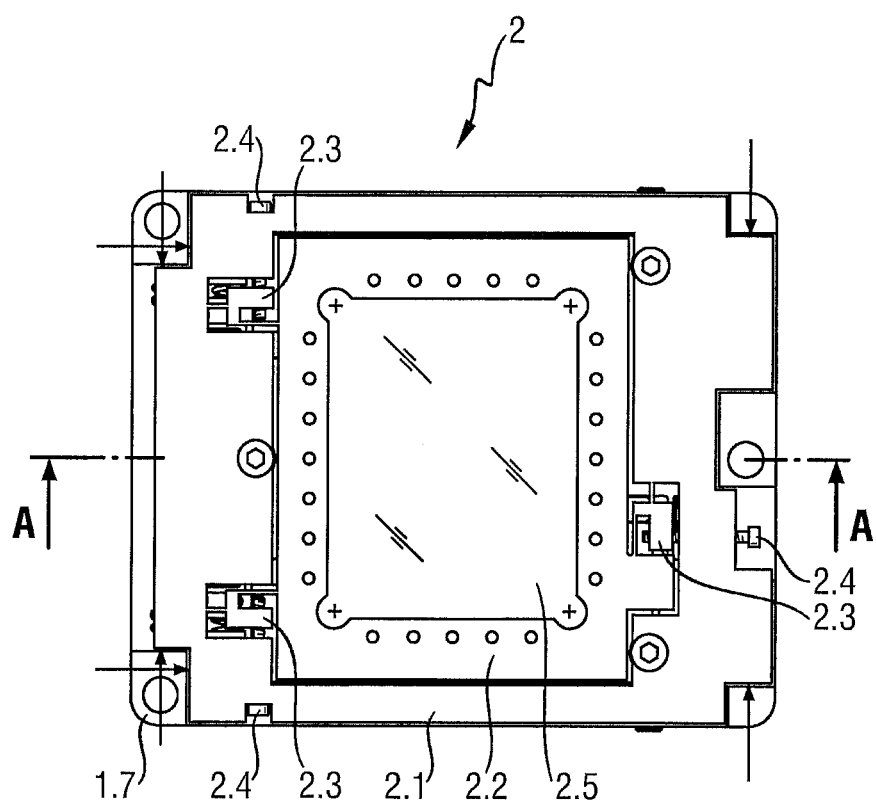
FIG. 2 a top view of a mount assembly according to FIG. 1 considered from the inner mount part.

FIG. 2 shows a top view of the mount assembly 7 considered from the inner mount part 2. The outer contour of the inner mount part 2 is adapted to the position of the protrusions 1.7 in such a way that the inner mount part 2 has clearance between the protrusions 1.7 and can be displaced within a predetermined adjustment range.

For purposes of displacement, adjusting screws 3 are inserted temporarily into the threaded holes 1.6. By introducing an adjustment path, these adjusting screws 3 displace the inner mount part 2 and finally clamp the latter in conjunction with adjusting screws 3 acting in the opposite direction. After the two mount parts 1, 2 are fixed relative to one another by the clamping device 4, which is not carried out until a further adjustment step is performed, the adjusting screws 3 can be removed.

By means of the first adjustment step (pre-adjustment) described above, the two optical components 1.5, 2.5 can be adjusted relative to one another within a large adjustment range but with a correspondingly limited sensitivity.

According to the described embodiment of the mount assembly, the two mount parts 1, 2 can be adjusted relative to one another before inserting the mount assembly 7 into the housing 8.

In another embodiment, the outer mount part 1 is fixed in the housing 8 and the inner mount part 2 is pre-adjusted by means of adjusting screws 3 which are arranged in the housing 8.

The clamping device 4 is a releasable connection which can connect the outer mount part 1 and the inner mount part 2 to one another by frictional engagement. The person skilled in the art will derive sufficient indications from the prior art for the construction of a clamping device 4 of this kind.

In this first embodiment example, the outer mount part 1 will be adjustable over a larger adjustment range with less sensitivity compared to the inner mount part 2.

In a corresponding manner, the two optical components 1.5, 2.5 can be adjusted first by manipulation of the outer mount part 1 (coarse adjustment) and then by manipulation of the inner mount part 2 (fine adjustment) or optionally only by manipulation of one of the two mount parts 1, 2.

Figure 4:
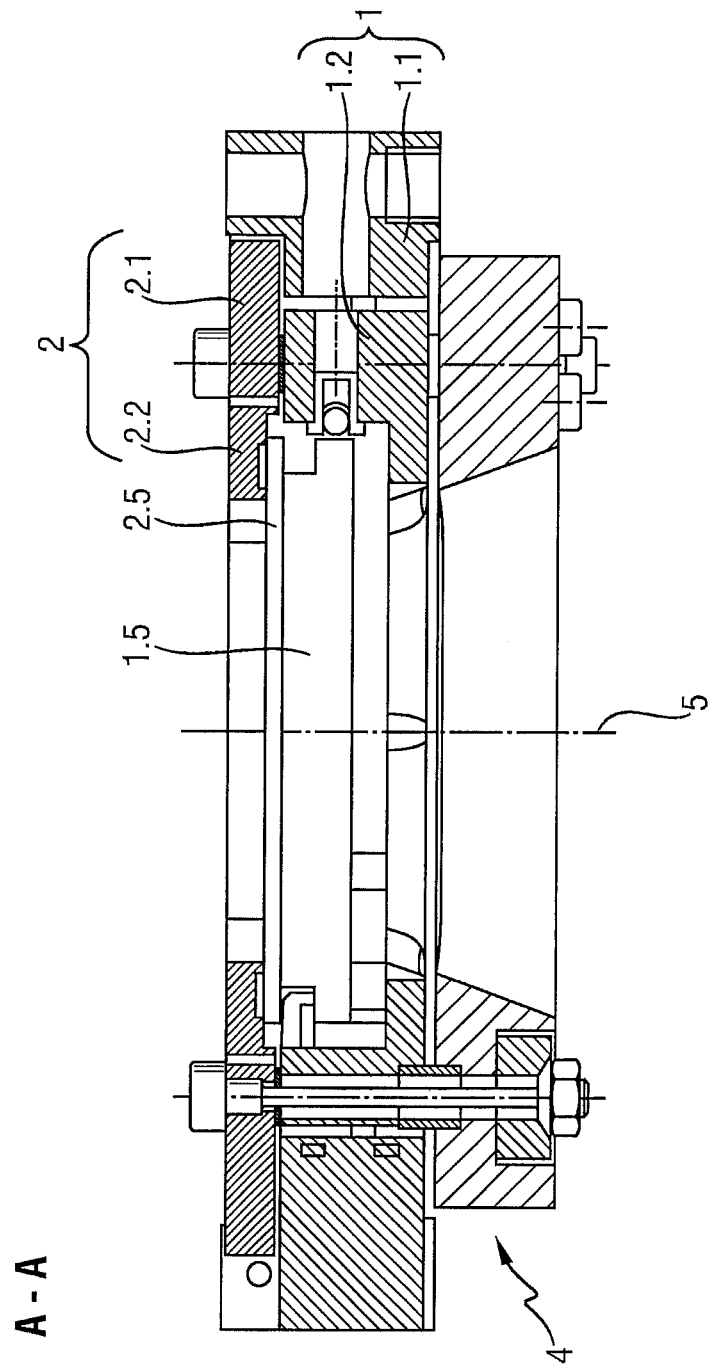
FIG. 4 a sectional view of the mount assembly shown in FIG. 2.

According to FIG. 4, the clamping device 4 is arranged in such a way that the inner mount frame 1.2 of the outer mount part 1 is connected to the outer mount frame 2.1 of the inner mount part 2.

The manipulator units 1.3, 2.3 of the mount parts 1, 2 are advantageously configured in such a way that the outer mount part 1 can be adjusted over a greater adjustment range with less sensitivity compared to the inner mount part 2.

Two optical components 1.5, 2.5 mounted in a mount assembly 7 according to the invention are adjusted relative to one another and relative to a reference base in the manner described in the following.

The adjustment in a plane perpendicular to axis 5 (lateral positioning) is carried out in a plurality of steps, finally with a sensitivity on the order of 0.050 μm. The adjustment steps are carried out by different means with an increasingly smaller adjustment range for the sake of an increasingly greater sensitivity and by different measuring methods for validating the state of adjustment.

In a first step for adjusting by steps (in a plurality of steps), the inner mount part 2 is first mounted on the outer mount part 1 in that it is placed between the protrusions 1.7 formed at the outer mount part 1. In so doing, the inner mount part 2 is positioned (assembly, pre-adjustment) in the outer mount frame 1.1 of the outer mount part 1 with adjusting screws 3 engaging on the outer mount frame 2.1 thereof. Adjustment is carried out until the adjustment marks provided on the two optical components 1.5, 2.5 coincide as closely as possible. The condition thus achieved is locked by clamping the opposing adjusting screws 3 while observing under a microscope.

This pre-adjustment is possible with an adjusting accuracy on the order of 5 to 10 μm.

In a next step, the adjustment is carried out until achieving an adjusting accuracy of better than 2 μm (coarse adjustment). In so doing, the clamping device 4 is released and the adjusting screws 3 are secured.

Through actuation of the manipulator units 1.3 of the outer mount part 1, the optical component 1.5 which is mounted in the outer mount part 1 can now be displaced and rotated relative to the optical component 2.5 mounted in the inner mount part 2. The potential adjustment range is smaller than that in the first adjustment step, but is considerably more sensitive. No locking is required because the manipulator units 1.3 are self-locking.

Before removing the adjusting screws 3 by which the inner mount part 2 and the outer mount part 1 were fixed relative to one another until the completion of the second adjustment step, the clamping device 4 is locked. Typically, there is a change in the adjustment state when locking, either owing to the torque or forces required for actuating the clamping device 4 (e.g., tightening torque applied to a screw) or due to the tensioning of the mount parts 1, 2. This cannot be completely avoided even with a clamping device 4 applying only axial forces to the mount parts 1, 2.

In order to achieve the desired sensitivity of 0.05 μM and to avoid an effect resulting from the fixing of the adjustment state reached in the second adjustment step, a third adjustment step (fine adjustment) is carried out by manipulating the inner mount part 1. The resulting adjustment is fixed by means of the self-locking of the manipulator units 2.3 of the inner mount part 2. This concludes the adjustment of the two optical components 1.5, 2.5.

Upon completion of the adjustment of the two optical components 1.5, 2.5 relative to one another, the optical assembly formed by these two optical components 1.5, 2.5 can be adjusted relative to a reference base without having to change the adjusted state of the two optical components 1.5, 2.5 relative to one another. This adjustment is carried out with a sensitivity of about 0.2 μm in an adjustment range of 30 μm. This is done by again manipulating the outer mount part 1, but with locked clamping device 4.

Referring to FIG. 1, the fully adjusted mount assembly 7 is screwed onto a housing 8 in which a third optical component 6 has already been mounted. This adjustment also need not be locked because the manipulator units 1.3 of the outer mount part 1 are self-locking.

In order to achieve the required stability under the influence of temperature, it is obvious that the materials used for the mount parts 1, 2 should have thermal coefficients of expansion that are as close as possible; that is, the mount parts 1, 2 are advantageously produced from Invar if the optical components are fabricated from fused silica (quartz). However, it is also advantageous to construct the mount parts 1, 2 from high-strength high-grade steel, preferably with a yield strength of at least 800 MPa.

In a particularly advantageous mount assembly 7, the optical components 1.5, 2.5 or 1.5, 2.5, 6 to be adjusted are microoptical elements. Thus, for example, in exposure devices for maskless exposure of wafers, the first optical component 1.5 can be a spatial filter array or pinhole array, the second optical component 2.5 can be a microlens array, and the third optical component 6, if any, can be a microlens array or another filter. Although, strictly speaking, components of this kind have a plurality of optical axes, only one axis 5 will be referred to again in the following for reasons of simplicity. This axis can be the centroidal axis.

The positioning of components of this kind relative to one another must be carried out in direction of the optical axis of an optical system in which they are integrated with an accuracy on the order of a few microns (e.g., ±3 μm).

For a mount assembly 7, an axial distance between the first optical component 1.5 and the second optical component 2.5 is realized by inserting spacers into the clamping mechanism 4 so as to define the position of the mount parts 1, 2 relative to one another in direction of the optical axis and therefore, indirectly, the distance of the optical components 1.5, 2.5 relative to one another.

Adjustment of the distance and parallelism is made possible through the configuration of the spacers as a three-point support. A tensioning of the mount parts 1, 2 to be connected is avoided at the same time.

The mount assembly 7 meets the most exacting requirements respecting stability over temperature changes or shock as well as extremely limiting installation space restrictions in the manipulation plane, but also in direction of the optical axis. To minimize the required installation space, the manipulation for the fine adjustment is carried out with the greatest possible sensitivity with a small installation space. For this purpose, it is necessary to reduce the adjustment range of the manipulator units 2.3 to a minimum. This is achieved by dividing the adjustment into three adjustment steps which are carried out by different means as was described above.

Owing to the given spatial conditions, the mount assembly 7 is configured in such a way that all actions (manipulation, locking) are carried out from the side and not from the top or bottom (i.e., in direction of the optical axis).

The adjustment can also be repeated after the mount assembly 7 has been installed in a completed optical system, because the adjusting means remain in the device.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 outer mount part
1.1 outer mount frame of the outer mount part
1.2 inner mount frame of the outer mount part
1.3 manipulator unit of the outer mount part
1.4 manipulator of the inner mount part
1.5 optical component mounted in the outer mount part
1.6 threaded bore hole
1.7 protrusion
2 inner mount part
2.1 outer mount frame of the inner mount part
2.2 inner mount frame of the inner mount part
2.3 manipulator unit of the inner mount part
2.4 manipulator of the inner mount part
2.5 optical component mounted in the inner mount part
3 adjusting screw
4 clamping device
5 axis
6 third optical component
7 mount assembly

What is claimed is:

1. Adjustable mount assembly comprising an outer mount part and an inner mount part, wherein
   a) the inner mount part is arranged in the outer mount part so as to be displaceable and fixable in a plane perpendicular to an optical axis by means of adjusting screws, and the outer and inner mount parts collectively form a first adjustable mount,
   b) the outer mount part forms a second adjustable mount, and the inner mount part forms a third adjustable mount,
   c) the outer mount part and the inner mount part respectively comprise an outer mount frame and an inner mount frame in which an optical component is fixed in each instance and which are connected to one another monolithically in each instance by at least three manipulator units having a manipulator for manipulating the mount parts,
   d) the inner mount frame of the outer mount part communicates with the outer mount frame of the inner mount part via a releasable clamping device effecting a frictional engagement, so that
   e) when the clamping device is released and the adjusting screws are tightened, the two optical components can be adjusted relative to one another by manipulating the outer mount part and/or inner mount part, and
   f) when the clamping device acts axially in a frictionally engaging manner so as to clamp the inner mount part to the outer mount part and the adjusting screws are loosened, the two optical components are adjustable relative to one another by manipulating the inner mount part, and the two optical components are jointly adjustable relative to a reference base by manipulating the outer mount part.

2. Adjustable mount assembly according to claim 1, wherein the outer mount part has a plurality of threaded bore holes which extend perpendicular to the axis and into which the adjusting screws can be inserted.

3. Adjustable mount assembly according to claim 1, wherein the two optical components are microoptical components.

4. Adjustable mount assembly according to claim 3, wherein the optical component mounted in the inner mount part is a microlens array, and the optical component mounted in the outer mount part is a spatial filter array.

\* \* \* \* \*